Patented July 20, 1954

2,684,309

UNITED STATES PATENT OFFICE 2,684,309

SIZE COMPOSITION AND FIBROUS GLASS ARTICLES COATED THEREWITH

Lawrence R. Deardurff, Central Falls, R. I., assignor to Owens-Corning Fiberglas Corporation, a corporation of Delaware No Drawing. Application April 16, 1951, Serial No. 221,329

9 Claims. (Cl. 117—72)

This invention relates to a size for fibers or filaments especially when in strand form. While the size may be used on naturally occurring fibers, organic fibers such as synthetic resinous fibers, or inorganic fibers such as mineral fibers, it is particularly adaptable to glass fibers which by nature are characterized by great strength and possess round, smooth surfaces.

One popular application of glass fibers or strands is as insulation for electrical conductors. For example, the strands may act as cable fillers and help to insulate its conductors from one another and serve to fill out or impart bulk to the cable. But more often, the strands are used as a braid which envelops one or more conductors, and in this form find wide application in automobile and aircraft cables, radio circuits, and the like. Although the invention is described in connection with cable braids, it is understood that strands having the present size may be used as cable fillers or for similarly related applications.

When glass strands are so used, it is customary to apply a size of a wax-like, often thermoplastic material having a fairly low softening temperature about the strand to impart lubricity and decrease self-abrasion. Without this protection, the fibers of the strand scratch against each other and ultimately sever at the scratches resulting in a substantial loss of strength in the strand.

In this condition, the cable braid is sensitive to slightly elevated temperatures since the fairly low temperature melting size is apt to flow and, prior to actual fabrication in a cable, may stick or fuse to other portions of the strand. In this manner, entire packages may be fouled causing considerable waste. Additionally, the size is frequently subject to deformation from even low pressures and to various agencies of attack such as moisture which tends to destroy the size to glass bond.

Accordingly, an overcoat or finish of a somewhat stiffer or less thermoplastic material is applied about the size to impart a harder and tougher surface to the filler. As an example, organosols and plastisols may be used for this purpose.

An important shortcoming in prior art cable braids is the incompatibility and poor adhesion between the size and its overcoat or finish. Those in use at present are so incompatible that in some cases it is not possible even to apply a satisfactory overcoat. In other cases when an initial overcoat is obtained, its adherence to the size is so loose that the overcoat frequently chips and breaks free of the strand. Often, the overcoat may flake off from a mere scratch such as by a finger nail.

One object of this invention is to provide an improved size for fibers or strands.

Another object is to provide a size for cable fillers comprising glass strands which is very compatible with and has considerably increased adherence to overcoat materials.

More specific objects and advantages are apparent from the following description which merely discloses and illustrates the invention and is not intended to limit the claims.

The invention is a size comprising a terphenyl and a hydrogenated terphenyl.

The present size has been found to have excellent adhesion to the various overcoats or finishes such as are used in cable braids. Further, strands treated with this size have increased braiding efficiency. The presence of both the terphenyl and hydrogenated terphenyl is necessary to realize the objects of the invention. The terphenyl alone is much too viscous, hard, and brittle. The hydrogenated terphenyl alone is too watery and has unsatisfactory adhesion to the glass. But when the two are mixed together, the resulting material has the desired viscosity for application to the strands, adheres very well, and is soft and flexible.

To this end, the relative proportions of each ingredient may be widely varied to obtain the degree of those properties desired. However, for most applications a mixture in weight of about 30 to 50 per cent terphenyl and 50 to 70 per cent hydrogenated terphenyl is satisfactory. The formulation which appears to combine best the desirable properties of each is in weight about 35 per cent terphenyl and 65 per cent hydrogenated terphenyl.

The present invention contemplates all the isomers of both the terphenyls and hydrogenated terphenyls.

The present size may be applied to fibers or strands such as glass fibers or strands by any of the conventional methods. For instance, the strand may be contacted by a cylindrical roll applicator at some point in the processing of the strand. For example, the strand may rub against the roll applicator as the strand passes from conventional twisting apparatus onto a shipping tube. The roll is rotated and simultaneously and continuously wetted by the present size. The size may drip onto the roll or the roll may be positioned in a sump tank containing the molten size in a depth sufficient to wet the roll.

A very simple method of application is merely to immerse a package of the strand in a molten bath of the size for a given time. In one case, a standard size package of strand was immersed for three hours in the preferred formulation maintained at 275° F. Following this, the package was allowed to drain for four hours at 250° F.

The amount of size deposited on a strand ranges, as an example, from about 11 to 19 percent by weight. A common deposition is about 15 per cent by weight of the strand.

The ingredients of the present size are not only very compatible with each other because of their chemical similarity but are unexpectedly found to be very compatible with a wide variety of resinous overcoats. Here and in the claims a resinous overcoat is taken to comprise natural resins such as lacquers, shellac, high temperature melting asphalt; thermosetting resins such as phenol formaldehyde, urea formaldehyde, resorcinol formaldehyde, phenol fufuraldehyde; and thermoplastic resins such as polystyrene, cellulose acetate, and especially the vinyl resins. For some reason, the present size has particularly good adhesion to resins having the vinyl radical. There is even some indication that the present size actually migrates to some extent into a vinyl resin overcoat to provide a "double fishhook" connection and afford an excellent adhesion bond.

The size is accordingly best suited with overcoats comprising such resins as polyvinyl chloride, polyvinylidene chloride, copolymers of vinyl chloride and vinylidene chloride, polyvinyl acetate, copolymers of vinyl chloride and vinyl acetate polyvinyl butyral and esters of acrylic acid (vinylformic acid) such as polymethyl acrylate, and polymethyl methacrylate.

In any case it is emphasized that whether the relationship between the size and overcoat is a mechanical or a chemical one, the purpose of the overcoat is to impart a hard, tough surface to the sized strand.

Various modifications and changes may be made in the invention to meet diverse requirements within the spirit and scope of the appended claims.

I claim:

1. A fibrous glass strand coated with a size consisting essentially of about 30 to 50 per cent by weight terphenyl and about 50 to 70 per cent by weight hydrogenated terphenyl.

2. A fibrous glass strand coated with a size consisting essentially of 35 per cent by weight terphenyl and 65 per cent by weight hydrogenated terphenyl.

3. A cable braid comprising a strand having a multiplicity of fine glass filaments coated with a size consisting essentially of about 30 to 50 per cent by weight terphenyl and about 50 to 70 per cent by weight hydrogenated terphenyl.

4. Cable braid comprising a continuous strand of glass fibers coated with a size consisting essentially of 35 per cent by weight terphenyl and 65 per cent by weight hydrogenated terphenyl.

5. A textile size for fibrous glass consisting essentially of 35% by weight terphenyl and 65% by weight hydrogenated terphenyl.

6. A cable braid comprising a strand having a multiplicity of fine glass filaments coated with a size consisting essentially of 35% by weight terphenyl and 65% by weight hydrogenated terphenyl coating the strand, and an outer coating comprising a plasticized polymerized vinyl resin.

7. Fibrous glass strand having a deposit of a size consisting essentially of from about 30% to 50% by weight terphenyl and from about 50% to 70% by weight hydrogenated terphenyl, said deposit being present in proportions of from 11% to 19% by weight based on the weight of the strand.

8. Cable braid comprising fibrous glass strand having a deposit of a size consisting essentially of from about 30% to 50% by weight terphenyl and from about 50% to 70% by weight hydrogenated terphenyl, said deposit being 15% by weight of the strand.

9. A textile size consisting essentially of about 30% to 50% by weight terphenyl and about 50% to 70% by weight hydrogenated terphenyl.

References Cited in the file of this patent

UNITED STATES PATENTS

| Number | Name | Date |
| --- | --- | --- |
| 2,473,997 | Hansley | June 21, 1949 |
| 2,479,130 | Moose | Aug. 16, 1949 |
| 2,557,786 | Johannson | June 19, 1951 |
| 2,590,493 | Berberich et al. | Mar. 25, 1952 |